(12) United States Patent
Engel et al.

(10) Patent No.: US 10,535,894 B2
(45) Date of Patent: Jan. 14, 2020

(54) GALVANIC ELEMENT

(71) Applicant: Robert Bosch GmbH, Stuttgart (DE)

(72) Inventors: Christine Engel, Enz Ensingen (DE); Michael Butzin, Stuttgart (DE); Ingo Kerkamm, Stuttgart-Rohr (DE)

(73) Assignee: Robert Bosch GmbH, Stuttgart (DE)

( * ) Notice: Subject to any disclaimer, the term of this patent is extended or adjusted under 35 U.S.C. 154(b) by 847 days.

(21) Appl. No.: 14/680,872

(22) Filed: Apr. 7, 2015

(65) Prior Publication Data

US 2015/0295274 A1 Oct. 15, 2015

(30) Foreign Application Priority Data

Apr. 9, 2014 (DE) .................. 10 2014 206 829

(51) Int. Cl.
*H01M 10/0562* (2010.01)
*H01M 10/0525* (2010.01)
*H01M 10/0565* (2010.01)

(52) U.S. Cl.
CPC ... *H01M 10/0562* (2013.01); *H01M 10/0525* (2013.01); *H01M 10/0565* (2013.01)

(58) Field of Classification Search
CPC ....................................................... H01M 4/62
See application file for complete search history.

(56) References Cited

U.S. PATENT DOCUMENTS

| | | | | |
|---|---|---|---|---|
| 2002/0006548 A1* | 1/2002 | Tsutsue | ................. | H01M 4/131 429/217 |
| 2013/0084501 A1* | 4/2013 | Wakayama | ......... | H01M 4/1397 429/231.8 |
| 2014/0011100 A1* | 1/2014 | Lee | ..................... | H01M 8/1016 429/403 |
| 2014/0017576 A1* | 1/2014 | Kim | .................... | H01M 4/5825 429/403 |

FOREIGN PATENT DOCUMENTS

| | | |
|---|---|---|
| DE | 10 2012 205 931 | 10/2013 |
| JP | 2011-113655 A | 6/2011 |
| JP | 2011-159528 A | 8/2011 |

* cited by examiner

*Primary Examiner* — Stephan J Essex
(74) *Attorney, Agent, or Firm* — Norton Rose Fulbright US LLP; Gerard Messina

(57) ABSTRACT

A galvanic element includes the following elements in the order listed: a current collector associated with an anode; the anode; an ion-conducting separator in the form of a continuous layer; a cathode; and a current collector associated with the cathode. The anode encompasses an ion-conducting support structure, and both the ion-conducting support structure and the separator encompasses an ion-conducting material. The ion-conducing support structure is porous.

21 Claims, 2 Drawing Sheets

GALVANIC ELEMENT

BACKGROUND OF THE INVENTION

1. Field of the Invention

The present invention relates to a galvanic element encompassing a current collector associated with the anode, an anode, a separator, a cathode, and a current collector associated with the cathode. The invention further relates to a battery cell encompassing a galvanic element of this kind, and to a battery encompassing multiple such battery cells.

2. Description of the Related Art

Lithium ion batteries are notable inter alia for a very high specific energy and extremely low self-discharge. Lithium ion cells possess at least one positive and at least one negative electrode (cathode or anode); lithium ions migrate from one electrode to the other electrode as the battery charges and discharges. A so-called "lithium ion conductor" is necessary in order to transport the lithium ions. In lithium ion cells used at present, which are utilized e.g. in the consumer sector (mobile telephone, MP3 player, etc.) or as energy reservoirs in electric or hybrid vehicles, the lithium ion conductor is a liquid electrolyte that often contains the conductive lithium salt lithium hexafluorophosphate ($LiPF_6$) dissolved in organic solvents. A lithium ion cell encompasses the electrodes, the lithium ion conductor, and current collectors that represent the electrical terminals.

The lithium ion cells can be enclosed in a package. Composite aluminum films, for example, can be used as a package. Cells packaged in this manner are also referred to, because of their soft packaging, as a "pouch" or "soft pack." In addition to the soft pack package design, hard metal housings are also utilized as packages, for example in the form of deep-drawn or cold-extruded housing parts. The term "hard housing" or "hard case" is used in this instance.

Lithium ion cells having a liquid electrolyte are disadvantageous in that under mechanical and thermal stress, the liquid electrolyte component can break down and an overpressure occurs in the cell. Without corresponding protective measures this can cause the cell to burst or even burn.

It is possible to use a solid ceramic or inorganic lithium ion conductor instead of a liquid electrolyte. This concept avoids bursting of the battery cell or leakage of substances upon damage to the package.

Published German patent application document DE 10 2012 205 931 A1 discloses an electrochemical energy reservoir as well as a method for manufacturing it. The electrochemical energy reservoir encompasses at least one electrode assembly in which an ion-conducting and electrically insulating separator layer is embodied on a coated surface. The ion-conducting layer is used as an electrolyte, so that a liquid electrolyte no longer needs to be used. For the embodiment as a lithium ion cell, the active materials proposed for the electrode assemblies are a lithium metal oxide, e.g. lithium cobalt oxide, for the cathode, and graphite for the anode. A ceramic powder having, for example, a particle size of 0.3 to 3 µm, for example lithium garnet, is proposed as a starting material for the ion conductor. The ceramic powder can be applied onto the surface to be coated, for example, in the form of an aerosol.

The use of a graphite anode as proposed in the existing art is disadvantageous because it has only a low energy density compared with an anode based on lithium metal. With lithium metal-based anodes in turn, it is more difficult to implement manufacture of a galvanic element because metallic lithium is highly reactive, and is stable only in completely dry environments.

When electrodes based on lithium metal are used with the known solid lithium ion conductors, the problem furthermore occurs that a high contact resistance occurs between the metallic lithium and the ion conductor, and thus only small ionization currents can flow. This problem becomes worse once a few charge-discharge cycles have occurred, since lithium ions become dissolved out of the anode upon discharge and the volume of the anode changes as a result.

A good contact that has been made upon manufacture, for example by press-joining, is then lost after a few charge-discharge cycles have occurred, since the lithium metal anode is no longer abutting tightly and with full coverage against the lithium ion conductor.

BRIEF SUMMARY OF THE INVENTION

The invention proposes a galvanic element encompassing, in this order: a current collector associated with the anode, an anode, an ion-conducting separator in the form of a continuous layer, a cathode, and a current collector associated with the cathode, the anode encompassing an ion-conducting support structure, and both the ion-conducting support structure and the separator encompassing an ion-conducting material and the ion-conducing support structure being porous.

The anode of the galvanic element encompasses a porous ion-conducting support structure. A structure of this kind can in principle be generated using any method known to one skilled in the art. The starting material used for the support structure contains an ion-conducting material, in particular a ceramic material. Depending on the manufacturing method the starting material can be present, for example, in the form of a powder—therefore in the form of a ceramic powder in the case of a ceramic starting material.

When the galvanic element is embodied as a lithium ion battery cell, a material that is lithium ion-conducting is preferred. Suitable materials are, for example, lithium ion-conducting ceramics. Lithium garnet is particularly suitable. Alternatively, the material can be selected from perovskites (LLTO) $Li_{3x}La_{2/3x}$—$TiO_3$, phosphates (LATP) $Li_{1+x}Ti_{2-x}M_x(PO_4)_3$ (where M=Al, Ga, In, Sc), sulfide glasses containing $Li_2S$ and $P_2S_5$ as well as doping elements such as Ge and Sn, and argyrodites $Li_6PS_5X$ (where X=I, Cl, or Br).

If a ceramic powder is used as a starting material, an aerosol coating, a sol-gel synthesis, or a solid state ceramic synthesis is particularly suitable. A pore-forming agent can be added, for example, to the starting material in order to generate the pores of the ion-conducting support structure. A suitable pore-forming material is, for example, cellulose, carbon fibers, or potato starch. Alternatively, a polymer that is later burned out can also be used. With polymers of high hardness, co-deposition by aerosol coating is also possible.

The proportion of pores in the ion-conducting support structure is, for example, between 20 vol % and 90 vol %. The proportion of pores is preferably between 50 vol % and 80 vol %. The porosity is selected so that it is as high as possible but mechanical stability still exists.

Depending on the embodiment, the ion-conducting support structure can firstly be generated on a substrate and later detached therefrom and introduced into the galvanic element. In other embodiments the ion-conducting support structure can be deposited with the aid of the coating method directly onto a constituent of the galvanic element. In order to increase electrical conductivity the support structure can be provided with a carbon-containing layer, e.g. by way of a chemical vapor deposition (CVD) process.

The separator of the galvanic element likewise encompasses an ion-conducting material. In particular, the ion-conducting materials suitable for the separator are the same ones as for the ion-conducting support structure. The separator is embodied, however, in such a way that it forms a continuous layer. The separator is moreover embodied in such a way that it is not electrically conductive.

Substantially the same coating methods, i.e. for example solid state ceramic synthesis, sol-gel synthesis, or aerosol coating, can be used to manufacture the separator. Aerosol coating is preferably used, although no pore-forming agent is added to the starting material. The separator manufactured in this manner has a residual porosity of less than 5 vol %; no open porosity is present, and the separator is therefore completely sealed.

The current collectors of the galvanic element are usually embodied as metal films. For the current collector associated with the anode, for example, a copper film having a thickness of between 6 μm and 12 μm is used. For the current collector associated with the cathode, for example, an aluminum film having a thickness of between 13 μm and 15 μm is used.

In further variant embodiments it is conceivable to use, instead of a metal film, a carrier material coated respectively with copper and aluminum. It is likewise conceivable to subject the current collector to a surface treatment in order to prevent a reaction with metallic lithium or with other constituents of the galvanic element.

The cathode preferably encompasses a mixture of an optionally pre-lithiated cathode active material, an electrically conductive material, and an ion conductor (catholyte).

In an embodiment of the invention, the conductive material is selected from carbon nanotubes, a conductive carbon black, graphene, graphite, or a combination of at least two of these materials.

In a preferred embodiment, in order to increase the electrical conductivity the material of the cathode can be present as a composite material having carbon. In an embodiment of the invention the composite material encompasses a mixture of sulfur particles as cathode active material, graphite and conductive carbon black in order to increase the electrical conductivity, and optionally a binder such as PVdF (polyvinylidene fluoride). In a further embodiment of the invention the composite material encompasses a mixture of SPAN (sulfur polyacrylonitrile), graphite and/or conductive carbon black, and a lithium ion-conducting polymer. In a further embodiment the composite material encompasses a mixture of optionally carbon as well as nanoparticles of LiF and a metal, for example Fe, Cu, Ni. In a further embodiment the composite material encompasses a mixture of optionally carbon as well as nanoparticles of $Li_2S$ and a metal, for example Fe, Cu, Ni. In another embodiment the pre-lithiation of the material has already occurred, and the composite material is made up of carbon and a lithium-containing metal hydride, metal sulfide, metal fluoride, or metal nitride.

In order to prevent migration of fluorine and thus a reaction with the ion conductor, a reaction with the current collector, or reactions with other battery components, in a preferred embodiment the composite material is equipped with a coating made, for example, of carbon or of an oxide (e.g. $Al_2O_3$) or a fluoride (e.g. $AlF_3$) or an oxyfluoride. In the sulfur-containing embodiment, a coating can also prevent the diffusion of polysulfides.

In a further embodiment of the invention the cathode active material is selected from a lithiated transition metal oxide, for example $Li(NiCoMn)O_2$, $LiMn_2O_4$ (or a higher Li content), $Li_2MO_3$-$LiMO_3$ (where M is, for example, Ni, Co, Mn, Mo, Cr, Fe, Ru, or V), $LiMPO_4$ (where M is, for example, Fe, Ni, Co, or Mn), $Li(Ni_{0.5}Mn_{1.5})O_4$ (or a higher Li content), $Li_xV_2O_5$, $Li_xV_3O_8$, or further cathode materials known to one skilled in the art, such as borates, phosphates, fluorophosphates, silicates.

In a further embodiment of the invention the cathode active material is selected from a lithiated sulfur, for example $Li_2S$, the material preferably being encapsulated in a carbon composite matrix, for example in the form of small spherules, in order to prevent dissolution or secondary reactions with the catholyte.

In an embodiment of the invention the ion conductor is a solid electrolyte based on polyethylene oxide (PEO) or on soy. In this embodiment the cathode active material and the conductive material are embedded in the solid electrolyte.

In a further embodiment of the invention the ion conductor in the cathode (catholyte) is a further porously configured support structure having an ion-conducting material. The same materials as those already used for the ion-conducting support structure of the anode and for the separator can be used as an ion-conducting material. In contrast to the separator, the material of the ion conductor can additionally have an even higher conductivity, although this need not necessarily be the case. In order to increase the electrical conductivity the support structure can be equipped with a carbon-containing layer, for example by way of a CVD process.

In a variant embodiment, an electrolyte layer encompassing a polymer electrolyte is disposed between the separator and the cathode. A polyethylene oxide-based electrolyte is, for example, suitable.

In another embodiment of the invention a liquid electrolyte is used as an ion conductor.

In a variant embodiment of the invention, a further separator, impregnated with a liquid electrolyte, is disposed between the separator and the cathode. The material of the further separator is preferably selected from glass fibers, polyethylene (PE), or polypropylene (PP) with or without ceramic filling. Suitable electrolytes are, for example, carbonate-containing electrolytes such as ethylene carbonate (EC), ethyl methyl carbonate (EMC), dimethyl carbonate (DMC), optionally with additives such as vinylene carbonate (VC) or monofluoroethylene carbonate (FEC).

Metallic lithium is preferably used as an active material for the anode. In an embodiment of the invention, the anode active material is placed in the form of a film of metallic lithium onto the porous ion-conducting support structure, and press-joined to it. In another embodiment the anode active material is introduced as a lithium melt into the porous ion-conducting support structure.

In an embodiment of the invention a cathode that encompasses a lithiated active material is used, and the anode is generated by electrochemical deposition when the galvanic element is first charged. When the galvanic element is first charged, lithium ions migrate out of the lithiated active material of the cathode through the separator, and become deposited on the current collector associated with the anode, and optionally in the pores of the ion-conducting support structure, in the form of a layer of metallic lithium.

By way of example, the following process occurs (based here on a sulfur-containing conversion cathode material):

$$2Li_2S + Fe^0 \leftrightarrow FeS_2 + 4Li^+ + 4e^-$$

In this case the cathode encompasses an active material that can be reversibly lithiated again upon discharge of the galvanic element.

A battery cell encompassing a cell package and a galvanic element of this kind is furthermore proposed. The cell package can be a soft pack package design or a hard housing.

Also proposed is a battery encompassing one or more such battery cells.

In the context of this description the term "battery" or "battery cell" is used in the manner usual in everyday speech, i.e. the term "battery" encompasses both a primary battery as well as a secondary (rechargeable) battery. The term "battery cell" similarly encompasses both a primary and a secondary cell.

The galvanic element according to the present invention has a large capacity and a high energy density.

The separator is embodied in the form of a continuous layer of an ion-conducting material, with which the anode and cathode are reliably electrically insulated from one another. In addition, dendrites that can form upon deposition of the lithium ions onto the anode cannot penetrate through the continuous layer of the separator and thus cannot short-circuit the galvanic element. At the same time, the anode of the galvanic element has a porously configured ion-conducting support structure that makes possible an intimate contact between the anode and the separator that also serves as an ion conductor. When contact between the anode and the separator serving as an ion conductor is poor, large contact resistance values occur and this limits the currents in the galvanic element.

To further reduce the contact resistance, an additional (gel) layer can optionally be used. The proposed improvements permit the use of metallic lithium as an anode material, which enables an increase in the energy density on the anode side by an order of 10 as compared with the graphite anodes usual in the existing art.

DETAILED DESCRIPTION OF THE INVENTION

Figure 1:
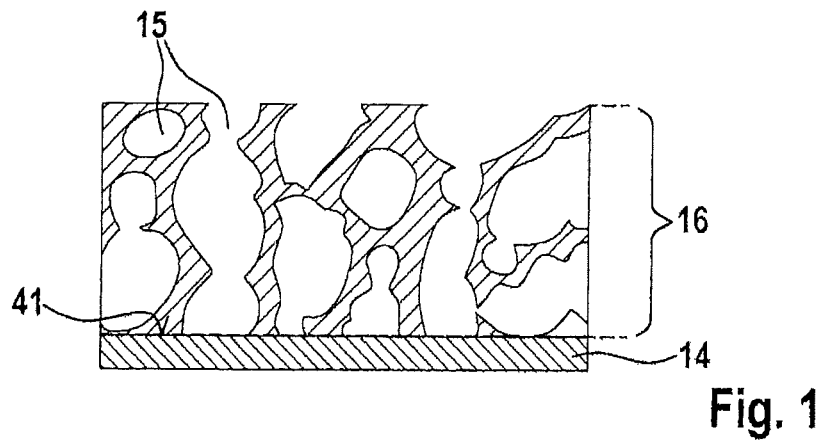
FIG. 1 shows a separator and an ion-conducting support structure for the anode.

In the description below of exemplifying embodiments of the invention, identical or similar components and elements are labeled with identical or similar reference characters, repeated description of said components or elements in individual cases being omitted. The Figures depict the subject matter of the invention merely schematically.

FIG. 1 depicts a separator 14 and an ion-conducting support structure 16, which ion-conducting support structure 16 encompassing an ion-conducting material is disposed on separator 14. Ion-conducting support structure 16 has pores 15, the proportion of pores being between 20 vol % and 90 vol %, preferably between 60 vol % and 80 vol %. A first boundary layer 41 forms between ion-conducting support structure 16 and separator 14. Ion-conducting support structure 16 has been manufactured using a coating method. Suitable coating methods encompass an electrode coating method or compression with subsequent solid ceramic synthesis, sol-gel synthesis, or aerosol coating. The starting material is usually present in the form of a powder. Lithium ion-conducting garnets, in particular lithium garnets, are particularly suitable as a starting material.

Pore-forming agents, for example cellulose, can be added to the starting material in order to form the pores.

Figure 2A:
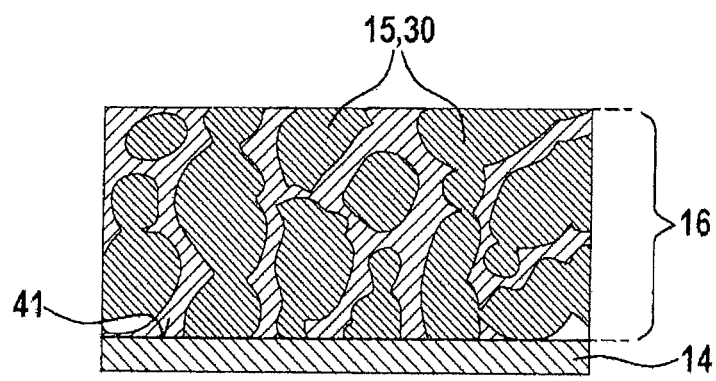
FIG. 2a shows the separator and the ion-conducting support structure in a charged state of the galvanic element.

FIG. 2a depicts separator 14 and ion-conducting support structure 16 in a charged state of galvanic element 10. In a variant of the invention, after separator 14 is manufactured, a film having metallic lithium is placed onto ion-conducting support structure 16 and is press-fitted thereonto, with the result that metallic lithium 30 penetrates into pores 15.

In another variant, only the current collector associated with the anode is applied onto ion-conducting support structure 16, and the active material for the cathode is applied onto that side of separator 14 which faces away from ion-conducting support structure 16. When the galvanic element is first charged, lithium ions then move out of the active material of the cathode through separator 14, and then become deposited partly in pores 15 and partly on the current collector associated with the anode.

Figure 2B:
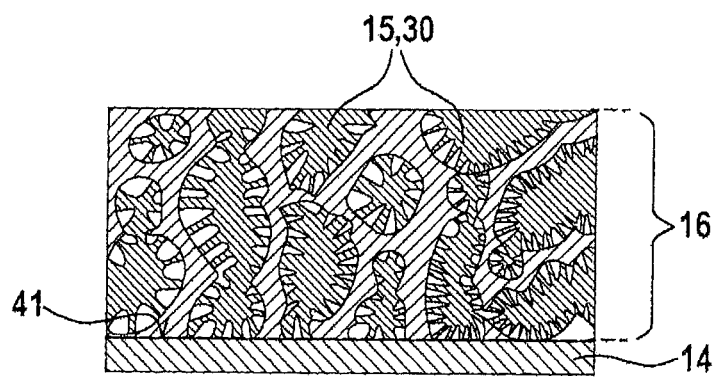
FIG. 2b shows the separator and the ion-conducting support structure in a partly discharged state of the galvanic element.

FIG. 2b depicts separator 14 and ion-conducting support structure 16 in a (partly) discharged state of galvanic element 10. As is evident from the depiction in FIG. 2, lithium ions have been dissolved out of the metallic lithium 30, have migrated through separator 14, and have become deposited again in the cathode material. Lithium 30 therefore no longer completely fills up pores 15. If applicable, in the context of a complete discharge all the lithium can even diffuse back into the cathode.

Figure 3:
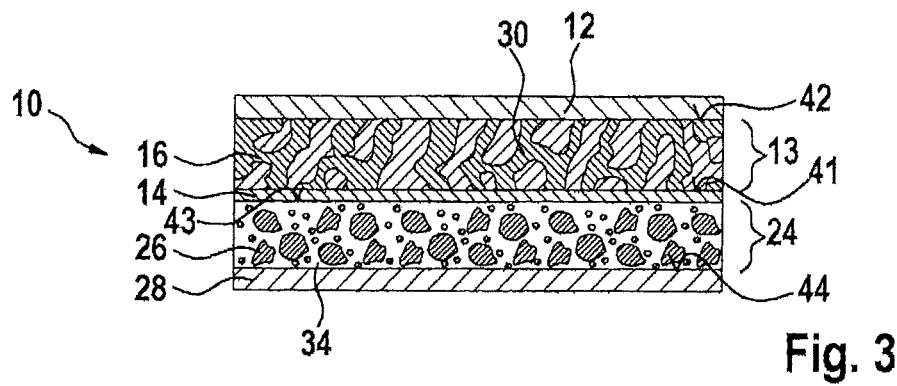
FIG. 3 shows a first embodiment of a galvanic element.

FIG. 3 depicts a first embodiment of a galvanic element 10 according to the present invention.

Galvanic element 10 encompasses a current collector 12 associated with the anode, an anode 13, a separator 14, as well as a cathode 24 and a current collector 28 associated with the cathode, in that order. A second boundary layer 42 therefore forms between current collector 12 associated with the anode and anode 13, a third boundary layer 43 between separator 14 and cathode 24, and a fourth boundary layer 44 between cathode 24 and current collector 28 associated with the cathode. First boundary layer 41 is located between anode 13 and separator 14.

Anode 13 encompasses an ion-conducting support structure 16 and metallic lithium 30 as an anode active material. The porously configured ion-conducting support structure 16 of anode 13 guarantees that the change in volume is less as compared with the use of a pure lithium film, and that even with a small change in the volume of anode 13, good electrical contact is still ensured between separator 14, which of course also serves as an ion conductor, and anode 13. Loss of contact between metallic lithium 30 and separator 14 is prevented by the porously configured ion-conducting support structure 16.

The material of cathode 24 also encompasses, besides a cathode active material 26, conductivity additives such as carbon nanotubes or a conductive carbon black. Cathode 24 furthermore encompasses an ion conductor (catholyte) in order to improve conductivity inside cathode 24. In the embodiment depicted in FIG. 3, the ion conductor is embodied as a polymer electrolyte 34, based e.g. on polyethylene oxide (PEO).

Cathode active material 26 contains lithium, which upon charging of galvanic element 10 becomes dissolved out of cathode active material 26 in the form of lithium ions and migrates through separator 14 toward current collector 12 associated with the anode. The lithium ions then become deposited on anode 13 in the form of metallic lithium. Upon discharge, the lithium ions then in turn dissolve out of anode 13 and migrate through separator 14 back into cathode 24, where they re-lithiate cathode active material 26.

Figure 4:
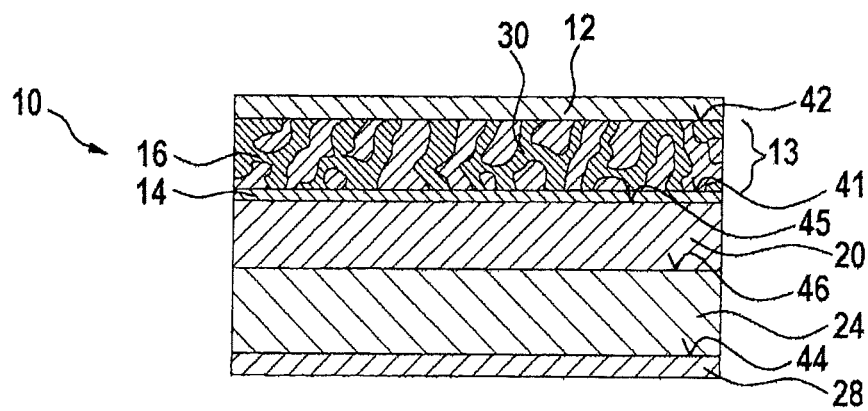
FIG. 4 shows a second embodiment of a galvanic element.

FIG. 4 depicts a further embodiment of galvanic element 10. Galvanic element 10 once again encompasses current collector 12 associated with the anode, anode 13, separator 14, cathode 24, and current collector 28 associated with the cathode.

In the embodiment depicted in FIG. 4, besides a cathode active material cathode 24 also encompasses conductivity additives, binders, and a liquid electrolyte as ion conductor.

In contrast to FIG. 3, in the embodiment depicted in FIG. 4 a further separator 20 is disposed between separator 14 and cathode 24. A fifth boundary layer 45 thus forms between separator 14 and further separator 20, and a sixth boundary layer 46 forms, instead of third boundary layer 43 described in FIG. 3, between further separator 20 and cathode 24. Further separator 20 likewise acts as an electrical insulator but cannot itself conduct ions. For ion conduction, further separator 20 is impregnated with an electrolyte that is present, for example, in liquid form.

Electrical contact between separator 14 and the cathode material is improved by the liquid electrolyte in further separator 20.

In a further variant of the invention it is conceivable to omit further separator 20.

Figure 5:
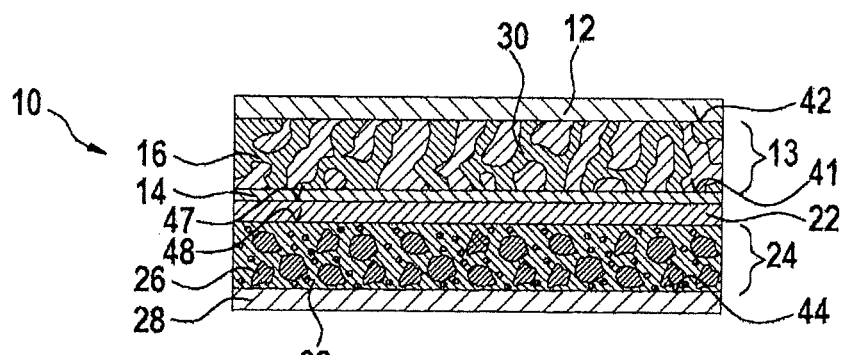
FIG. 5 shows a third embodiment of a galvanic element.

FIG. 5 shows a third embodiment of galvanic element 10. Once again galvanic element 10 encompasses current collector 12 associated with the anode, anode 13, separator 14, cathode 24, and current collector 28 associated with the cathode.

In the embodiment depicted in FIG. 5, cathode 24 has a further ion-conducting support structure 32 as an ion conductor. This further ion-conducting support structure 32 is embodied here as a garnet infiltrated with cathode active material 26, the garnet serving as an ion conductor. It is conceivable for separator 14 also to be embodied as a garnet, the garnets of separator 14 and of further ion-conducting support structure 32 optionally being capable of having different chemical compositions. For example, $Li_7La_3Zr_2O_{12}$ is suitable as a material for the separator; and Fe-doped and Li-enriched $Li_{4+x}Ti_5O_{12}$ is suitable, thanks to its high ion conductivity, for further ion-conducting support structure 32.

The cathode can furthermore encompass additives to improve conductivity, for example carbon nanotubes or a conductive carbon black.

In the embodiment depicted in FIG. 5 an additional electrolyte layer 22 is disposed between separator 14 and cathode 24. Electrolyte layer 22 is preferably embodied as a polymer electrolyte, for example based on polyethylene oxide. A seventh boundary layer 47 thus forms between separator 14 and electrolyte layer 22, and an eighth boundary layer 48, instead of third boundary layer 43 described in FIG. 3, forms between electrolyte layer 22 and cathode 24. Electrolyte layer 22 serves to improve ion conduction between cathode 24 and separator 14.

The invention is not limited to the exemplifying embodiments described here, and to the aspects emphasized therein. A plurality of variants that are within the competence of one skilled in the art are instead possible within the scope indicated by the claims.

What is claimed is:

1. A galvanic element, comprising, in the following order:
    a current collector associated with an anode;
    the anode, wherein the anode includes an ion-conducting support structure with a first porosity, defined by pores in the ion-conducting support structure, at a particular volume percent of the ion-conducting support structure;
    an ion-conducting separator in the form of a continuous layer consisting of a same ion-conducting material as that of which the ion-conducting support structure of the anode is formed but without a porosity as great as that of the ion-conducting support structure of the anode;
    a cathode; and
    a current collector associated with the cathode.

2. The galvanic element as recited in claim 1, wherein the ion-conducting material is a lithium ion-conducting ceramic.

3. The galvanic element as recited in claim 2, wherein the ion-conducting material is lithium garnet.

4. The galvanic element as recited in claim 2, wherein the separator is manufactured by aerosol coating.

5. The galvanic element as recited in claim 2, wherein the cathode includes an ion conductor.

6. The galvanic element as recited in claim 5, wherein the ion conductor is a further ion-conducting support structure made of an ion-conducting material which is porous.

7. The galvanic element as recited in claim 1, further comprising an electrolyte layer that includes a polymer electrolyte and that is arranged between the ion-conducting separator and the cathode.

8. The galvanic element as recited in claim 5, wherein the ion conductor is a liquid electrolyte.

9. The galvanic element as recited in claim 5, wherein the ion conductor is a further separator impregnated with a liquid electrolyte.

10. The galvanic element as recited in claim 5, wherein the ion conductor is a polymer electrolyte.

11. The galvanic element as recited in claim 2, wherein the porosity of the porously configured ion-conducting support structure is between 20 vol % and 90 vol %.

12. A battery cell, comprising:
    a cell housing; and
    a galvanic element including, in the following order:
        a current collector associated with an anode;
        the anode, wherein the anode includes an ion-conducting support structure with a first porosity, defined by pores in the ion-conducting support structure, at a particular volume percent of the ion-conducting support structure;
        an ion-conducting separator in the form of a continuous layer consisting of a same ion-conducting material as that of which the ion-conducting support structure of the anode is formed but without a porosity as great as that of the ion-conducting support structure of the anode;
        a cathode; and
        a current collector associated with the cathode.

13. The galvanic element as recited in claim 1, wherein:
    the ion-conducting separator is at a first side of the ion conducting support structure; and
    a film that is press-fit onto a second side of the ion conducting support structure includes metallic lithium that penetrates into pores of the ion conducting support structure.

14. The galvanic element as recited in claim 13, wherein the current collector associated with the anode is at the second side of the ion conducting support structure.

15. The galvanic element as recited in claim 1, wherein:
    the ion conducting support structure is arranged at a first side of the separator;

the current collector associated with the anode is applied onto the ion conducting support structure;

the cathode includes an active material applied onto a second side of the separator that is opposite the first side; and the anode, ion-conducting separator, current collector associated with the anode, and the cathode are part of a structure that is arranged and structured for being charged and for lithium ions to move out of the active material of the cathode, through the separator, and then deposit partly in pores of the support structure and partly on the current collector associated with the anode during a first charging of the structure.

16. A galvanic element prior to an initial charging of the galvanic element, the galvanic element comprising:

a structure that includes:

an anode that includes an ion conducting support structure with a first porosity, defined by pores in the ion conducting support structure at a particular volume percent of the ion conducting support structure, and without appreciable presence of lithium ions housed in the ion conducting support structure;

an ion-conducting separator at a first side of which the anode is arranged and that includes a same ion-conducting material as that of which the ion conducting support structure of the anode is formed but without a porosity as great as that of the ion conducting support structure of the anode;

a current collector that is associated with the anode, is applied onto the ion conducting support structure, and on which no lithium ions are deposited; and a cathode that (a) includes an active material that is applied onto a second side of the separator that is opposite the first side and includes lithium ions, and (b) is separated from the ion conducting support structure by the ion-conducting separator;

wherein the structure is arranged and structured for being charged and for at least some of the lithium ions in the active material of the cathode to move out of the active material of the cathode, through the separator, and then deposit partly in the pores of the support structure and partly on the current collector associated with the anode during the initial charging of the structure.

17. The galvanic element as recited in claim 1, wherein the anode further includes a carbon layer deposited on the ion-conducting support structure.

18. The galvanic element as recited in claim 1, wherein the ion-conducting separator is non-porous or has a porosity of less than 5 vol %.

19. The galvanic element as recited in claim 1, wherein the particular volume percent of the first porosity is 50-80 vol %.

20. The galvanic element as recited in claim 1, wherein the particular volume percent of the first porosity is 60-80 vol %.

21. The galvanic element as recited in claim 1, wherein the ion-conducting separator is non-porous or has a porosity of less than 5 vol % and the particular volume percent of the first porosity is 20-90 vol %.

* * * * *